United States Patent [19]

Correia

[11] Patent Number: 5,355,651
[45] Date of Patent: Oct. 18, 1994

[54] MOUNTING ARRANGEMENT FOR SECURING A PANE OF WINDOW GLASS IN A FRAME

[75] Inventor: Jacques Correia, Barby, France

[73] Assignee: Draftex Industries Limited, Edinburgh, Scotland

[21] Appl. No.: 16,753

[22] Filed: Feb. 11, 1993

[30] Foreign Application Priority Data

Feb. 15, 1992 [GB] United Kingdom ................ 9203276

[51] Int. Cl.⁵ .............................................. B60J 1/02
[52] U.S. Cl. ..................................... 52/716.7; 52/208; 29/243.58; 29/451; 29/509; 296/201
[58] Field of Search ................ 29/172, 243.5, 243.56, 29/450, 451, 897.2, 243.57, 243.58, 509; 24/326, 329, 331; 49/463, 466; 52/207, 208, 397–400, 403, 489, 716.5, 716.6, 716.7, 716.8; 296/93, 96.21, 201, 206

[56] References Cited

U.S. PATENT DOCUMENTS

| 3,274,740 | 9/1966 | Hall | 52/716.6 X |
| 4,007,536 | 2/1977 | Soderberg | 52/400 X |
| 4,147,006 | 4/1979 | Kruschwitz | 52/716.7 X |
| 4,278,286 | 7/1981 | Kiba et al. | 296/93 |
| 4,532,741 | 8/1985 | Knüdel | 296/201 X |
| 4,696,128 | 9/1987 | Fukuhara | 52/716.7 X |

FOREIGN PATENT DOCUMENTS

| 0268815 | 6/1988 | European Pat. Off. . |
| 0304694 | 3/1989 | European Pat. Off. . |
| 0323014 | 7/1989 | European Pat. Off. . |
| 2340217 | 9/1977 | France . |
| 781200 | 8/1957 | United Kingdom ........... 52/716.7 |
| 1292416 | 10/1972 | United Kingdom . |
| 2112842 | 7/1983 | United Kingdom . |
| 2221713 | 2/1990 | United Kingdom . |

Primary Examiner—Peter Dungba Vo
Attorney, Agent, or Firm—Leydig, Voit & Mayer

[57] ABSTRACT

A glass mounting arrangement for mounting a window glass in a window frame comprises a channel-shaped flexible strip which has apertures at intervals therealong. Each aperture sealingly receives an arm of a respective mounting clip. Each mounting clip has a U-shaped portion which seats in a recess in the channel of the strip. The strip with the clips mounted therein is placed on and along the peripheral edge of the window glass before the latter is offered up to the window frame. As the window glass is moved bodily towards the window frame, the arms contact the window frame and correctly position the window glass with respect to the window frame. The arms of the clips elastically deform to allow locking shoulders to pass over the edge of the frame, the arms thereafter resiling to secure the window glass in position. Lips provide additional sealing. The mounting arrangement is particularly suitable for use with a robot.

18 Claims, 2 Drawing Sheets

MOUNTING ARRANGEMENT FOR SECURING A PANE OF WINDOW GLASS IN A FRAME

BACKGROUND OF THE INVENTION

The invention relates to glass mounting methods and arrangements. In one application to be described in more detail below by way of example, a glass mounting method and arrangement in accordance with the invention is used for mounting a fixed window glass in a motor vehicle body. This method and arrangement advantageously also provides a sealing function.

Glass mounting methods and arrangements are known in which a window glass is fitted in a window frame by means of a flexible mounting and sealing strip such as made of plastics or rubber material. Such a strip is provided with two channels which extend longitudinally of the strip and parallel to each other and face in opposite directions. A first one of these channels is embracingly fitted over the peripheral edge of the window glass. The second channel embraces the peripheral edge of the window frame. However, such a mounting arrangement is difficult to fix onto the window frame, mainly because the outer wall of the second channel has to be temporarily pulled outwardly in order to allow the mounting arrangement to be fitted onto the edge of the window frame. In particular, such a mounting arrangement is difficult to fit automatically, such as by robot.

BRIEF DESCRIPTION OF THE INVENTION

According to the invention, there is provided a glass mounting arrangement for securing a pane of glass in a frame, comprising a flexible strip for providing a seal between an edge of the window glass and the frame, and at least one clip for gripping the edge of the glass and for mechanically securing the glass relative to the frame characterised in that the strip comprises means for locating and securing the clip relative to the strip, and in that the clip includes securing means operative when the strip with the clip secured thereon is fitted to the window glass for lockingly engaging the frame.

According to the invention, there is further provided a glass mounting arrangement for mounting a window glass in a window frame, comprising a channel-shaped flexible sealing strip for embracing the edge of the window glass and a plurality of clips each having a U-shaped portion with one limb of the U extended to form a locking portion, for locking the strip and the window glass to the frame, characterised in that the strip defines a plurality of apertures therethrough which are arranged spaced from each other along the length of the strip, the clips being adapted to be positioned with their U-shaped portions seated within the channel of the strip before the strip embraces the edge of the window glass, the clips being spaced apart along the length of the strip with the locking portions of the clips respectively extending through the said apertures to the outside of the strip, each locking portion defining a locking formation for lockingly engaging itself relative to the window frame so as to mount the window glass in the frame.

According to the invention, there is also provided a glass mounting method for mounting a window glass in a window frame, comprising the steps of fitting a plurality of mounting clips spaced apart along the edge of the window glass, each clip having a portion embracing the window glass and a locking portion for lockingly engaging the frame, characterised by the steps of locating the clips relative to each other and on the edge of the window glass before the glass is fitted to the frame, and moving the window glass with the clips thereon towards the window frame in a direction substantially perpendicular to the plane of the window glass so that the locking portions interact with the window frame to position the window glass with respect thereto and then lockingly engage the window frame to hold the window glass in position in the frame.

BRIEF DESCRIPTION OF THE DRAWINGS

Glass mounting methods and arrangements according to the invention, for mounting a window glass in a frame in a motor vehicle body, will now be described, by way of example only, with reference to the accompanying diagrammatic drawings in which.

DESCRIPTION OF PREFERRED EMBODIMENT

Figure 1:
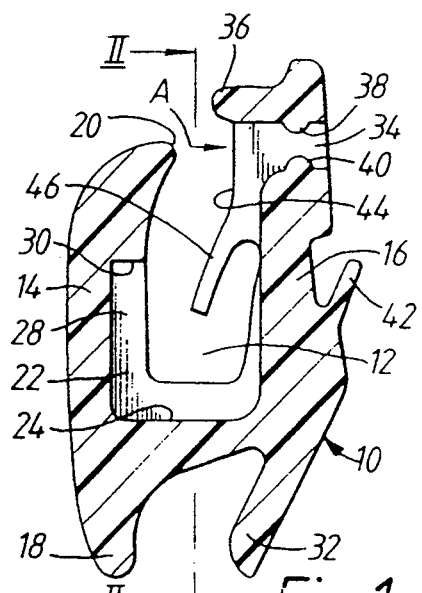
FIG. 1 is a cross-section through a flexible sealing strip forming part of one of the arrangements, taken on the line I—I of FIG. 2.
Figure 2:
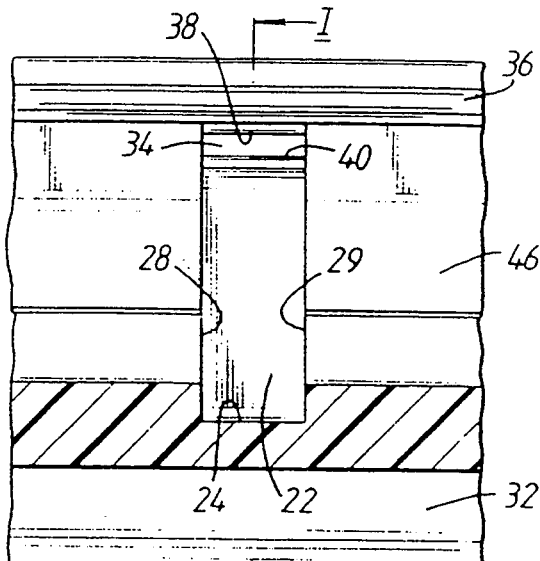
FIG. 2 is a section of the strip of FIG. 1 taken on the line II—II of FIG. 1.

As shown in FIGS. 1 and 2, the mounting arrangement comprises a longitudinally extending strip 10 made of flexible material such as moulded plastics or rubber material. In use, in a manner to be explained, it extends around the entire periphery of the window glass. The strip is formed to define a channel 12 which in use (in a manner to be described) receives the periphery of the window glass. The channel 12 is defined by walls 14 and 16. In use, the wall 14 is on the outside of the window glass (that is, on the outside of the vehicle body), while the wall 16 is on the inside of the window glass. Along the lower part of the wall 14, it is formed to provide a lip 18. Along its upper part, it is curved partly over the mouth of the channel 12 to form another lip 20.

The wall 14 is formed with a plurality of recesses 22, each and in communication with the channel 12. One such recess is visible in FIG. 1. Each recess has a lower face 24, side faces 28 and 29 and an upper face 30.

The inner wall 16 defines a lip 32 running along its lower part. Its upper part is formed with a series of through apertures 34 (see FIG. 2). Above these apertures, the wall 16 is formed with a lip 36 extending partway across the mouth of the channel 12. Each aperture 34 is positioned in alignment, along the length of the strip, with a respective one of the recesses 22.

Each aperture 34 is formed with two internal enlargements 38 and 40 for a purpose to be described.

On its outer face, the wall 16 is provided with a further lip 42.

The inner face 44 of the wall 16 is provided with a series of integrally moulded lips 46 which extend partway across the width of the channel 12. The lips 46 together extend along the length of the strip but with gaps between them, each gap being positioned in alignment with a respective one of the recesses 22 and apertures 34.

Figure 3:
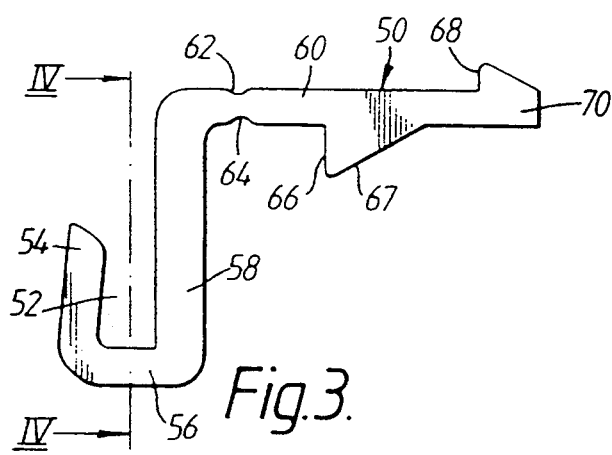
FIG. 3 is a side view of a mounting clip forming part of the mounting arrangement.
Figure 4:
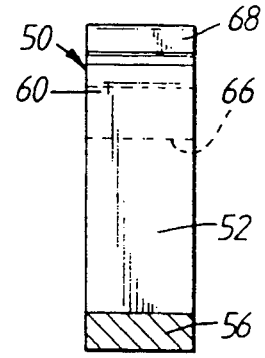
FIG. 4 is section on the line IV—IV of FIG. 3.

The mounting arrangement includes a plurality of clips 50 (see FIGS. 3 and 4), each of the same form and made of resilient material. Each clip has a U-shaped portion 52 comprising a first side limb 54, a base 56 and a second side limb 58. The latter limb is extended upwardly and then at right angles to form an arm 60. The arm 60 is provided with grooves 62 and 64, shoulders 66 and 68 and a head 70.

Before mounting of the window glass takes place, the clips 50 are fitted in position in the strip 10. A respective clip 50 is fitted in each aperture 34. The head 70 of each clip is pushed through the respective aperture 34 in the direction of the arrow A shown in FIG. 1, the plastics or rubber material deforming to allow the head 70 and the shoulder 66 to pass through. During this process, the clip is positioned so that the U-shaped portion 52 lies approximately at right angles to the channel 12. The clip is pushed through the aperture 34 until its face 72 engages the inner face 74 of the channel wall 16. During this process, the lip 20 is forced outwardly to provide clearance for the clip.

Each of the clips is then pivotted so that its U-shaped portion 52 moves downwardly into the corresponding recess 22 in the channel 12. Each clip thus assumes the position shown in FIG. 5. During this process, the grooves 62 and 64 in the arm 60 of each clip engage the enlargements 38 and 40.

Figure 5:
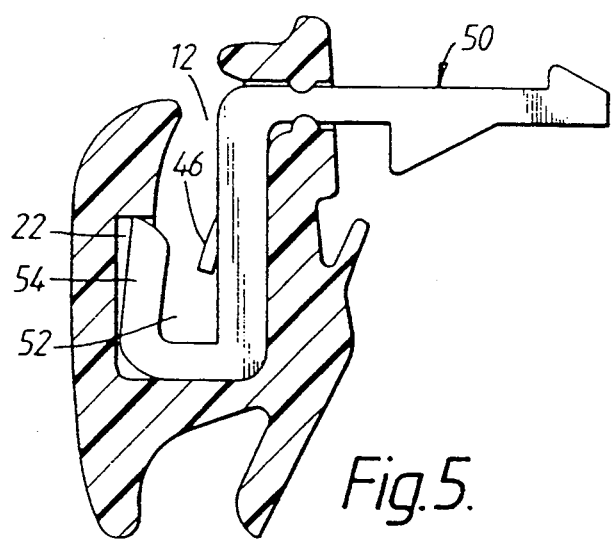
FIG. 5 is a view corresponding to FIG. 1 but showing the mounting clip of FIGS. 3 and 4 fitted in position in the strip of FIG. 1.

FIG. 5 shows the final position of each clip 50 within the strip. It will be seen that the limb 54 of the U-shaped portion 52 of the clip lies almost wholly within the recess 22 within the outer wall 14, but the side limb 54 extends slightly into the channel 12.

Figure 6:
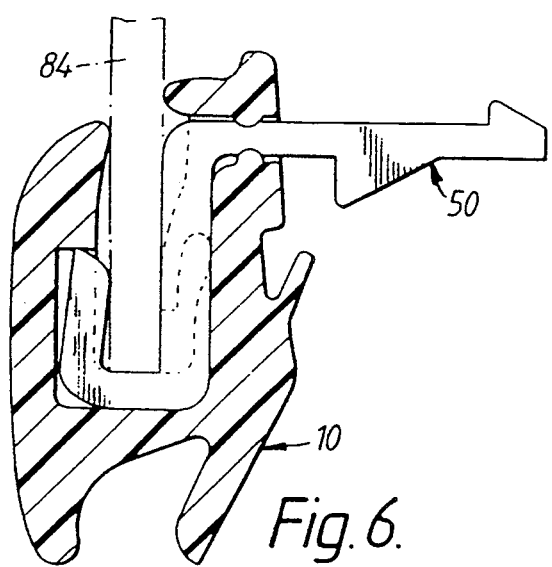
FIG. 6 shows the strip of FIG. 1, incorporating the clips of FIGS. 3 and 4, mounted on a window glass before the latter is mounted in the window frame.

The next stage in the fitting process comprises the fitting of the strip 10 (carrying the clips 50) onto the periphery of the window glass 84 (FIG. 6). During this process, the peripheral edge of the window glass enters the channel 12 of the strip and engages the U-shaped portions 52 of all the clips 50. The resilience of the material of the clips 50 facilitates this process and ensures that the clips firmly grip the edge of the glass. The faces of the glass also sealingly make contact with the lips 20,36 and 46. Each of the clips is formed with a radiussed corner at 86 and an inclined face at 88 to ease this assembly process.

Figure 7:
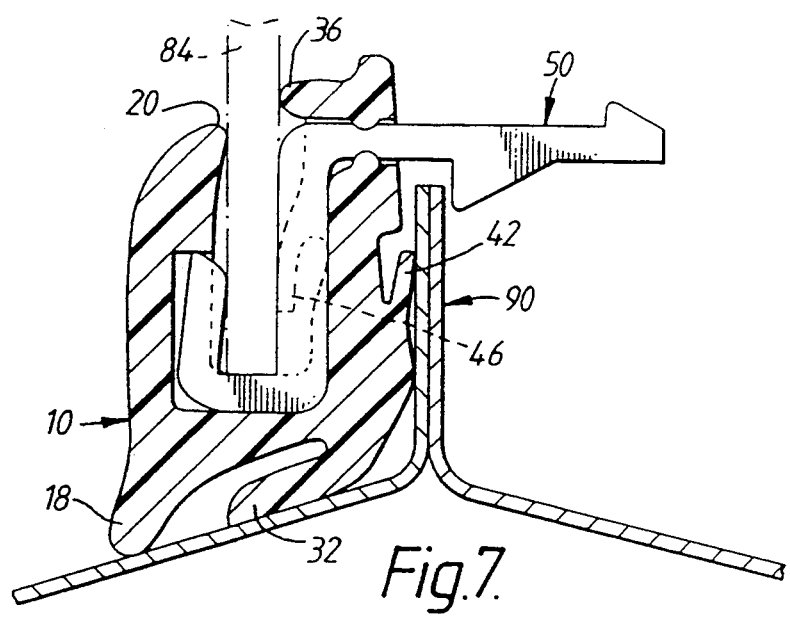
FIG. 7 is a view corresponding to FIG. 6 but showing the window glass mounted in position on the window frame.

The process of fitting the window glass on the window frame 90 (FIG. 7) can now be completed. The window glass, with the strip 10 and the clips 50 in position around its periphery, is then moved bodily towards the window frame 90 in the direction of the arrow B in FIG. 7. During this process, the arms 60 of the clips provide respective locating means which help automatically to centre the window glass in the window opening. The strip 10, the positions of the apertures 34 therein, and the clips 50 are dimensioned so that the arms 60 of the clips are just clear of the edge of the frame 90. As the window glass moves in the direction of the arrow B, the inclined faces 67 of the shoulders 66 of the clips slide on the frame 90, elastically bending the arms 60 so that the shoulders 66 pass over the frame 90 into the position shown in FIG. 7 into which they resile. The window glass, with the strip 10 in position on it, is now securely held in position in the window frame 90 by engagement between the latter and the shoulders 66. The strip 10 is held in position with the lips 18 and 32 sealingly engaging the bodywork panel 92 adjacent the window frame, and with the lip 42 sealingly engaging the outer face of the window frame 90 itself.

The head 70 of each clip 50 may also engage behind another bodywork element (not shown) on the interior of the vehicle. The inclined surface of the head 70 enables the head to be elastically deformed to pass over this element so as then to resile until the shoulder 68 engages behind it.

In this way, the window glass is securely locked in position in the window frame 90. In addition, the assembly process is simple and automatically positions the window glass correctly with respect to the window opening, and can thus be carried out relatively easily by means of a robot. Furthermore, the lips 20,36 and 46 provide good sealing between the glass 84 and the strip 10, and the lips 18,32 and 42 provide good sealing between the strip 10 and the bodywork.

Figure 8:
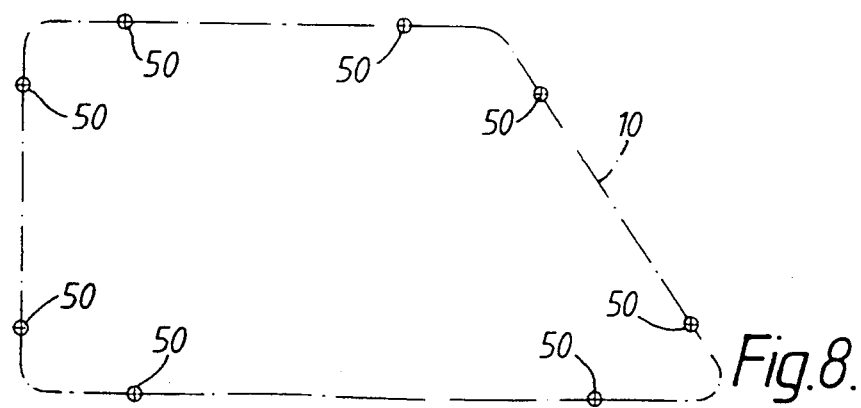
FIG. 8 is a diagrammatic side view of the strip of FIG. 6, showing the positions where clips of the type shown in FIGS. 3 and 4 may be fitted to it.

FIG. 8 is a diagrammatic view of the strip 10 extending around the periphery of the window opening, and shows positions at which the clips 50 may be placed. However, they can of course be placed in different positions and there can be a greater or lesser number of them.

Various modifications may be made to the mounting arrangement described. For example, a sealing mastic may be placed between the lip 32 and the adjacent bodywork member and/or between the lip 18 and that bodywork member and/or between the lip 42 and the window frame 90. Instead, or in addition, a sealing mastic may be placed within the channel 12, around the peripheral edge of the window glass. Supplementary adhesive may be used between the strip 10 and the window frame 90. A supplementary sealing strip may be placed between the lip 32 and the bodywork.

The distal end of the arm 60 of each of the clips 50 may be shaped differently from the shape illustrated in the figures. For example, it may be divided at its end so as to carry out two separate functions—helping to hold the seal 10 and the glass in position and helping to secure the internal trim of the vehicle body.

Many other modifications may be made.

What is claimed is:

1. A glass mounting arrangement for securing a pane of window glass in a frame, comprising
   a flexible strip for providing a seal between an edge of the window glass and the frame,
   a least one clip for gripping the edge of the glass and for mechanically securing the glass relative to the frame, and
   means for locating and securing the clip relative to the strip,
   the clip including a U-shaped portion, said U-shaped portion embracing the said edge of the window glass, said clip further including securing means, operative when the strip with the clip secured thereon is fitted to the window glass, for lockingly engaging the frame, the securing means comprising a locking portion extending from the U-shaped portion for mechanically locking the clip relative to the frame after the clip has been secured to the strip.

2. The arrangement according to claim 1, in which the securing means comprises an aperture defined in the strip and through which the locking portion of the clip passes.

3. The arrangement according to claim 1, in which the securing means comprises a channel in the strip for receiving the U-shaped portion of the clip.

4. The arrangement according to claim 3, in which the said channel extends longitudinally of the strip and embraces the edge of the window glass when the strip with the clip secured thereto is fitted to the edge of the glass, the U-shaped portion of the clip also embracing the said edge.

5. The arrangement according to claim 3, in which the strip includes at least one flexible lip extending inwardly of the channel from an internal wall thereof for sealingly engaging a face of the window glass.

6. The arrangement according to claim 1, in which the locking portion defines a locking formation for lockingly engaging the window frame.

7. The arrangement according to claim 6, in which the locking portion is elastically deformable to enable the window glass with the strip and the clip fitted thereto to be moved into position on the window frame, the locking portion deforming during such movement upon contact with the frame and thereafter resiling to enable the locking formation to move into locking relationship with the frame.

8. The arrangement according to claim 1, including at least one lip integrally extending from an external wall portion of the strip for sealingly engaging against the window frame.

9. The arrangement according to claim 1, in which there are a plurality of the clips positioned at intervals along the length of the strip.

10. A glass mounting arrangement for mounting a window glass in a window frame, comprising
 a channel-shaped flexible sealing strip for embracing an edge of the window glass, the strip defining two side walls for the channel and a base of the channel which together constitute an internal surface of the channels, and
 a plurality of clips each having a U-shaped portion, with on limb of the U extended to form a locking portion, for locking the strip and the window glass to the frame,
 the strip defining a plurality of apertures through one of the side walls of the channel which are arranged spaced from each other along the length of the strip,
 the clips being positioned with their U-shaped portions seated within the channel of the strip before the strip embraces the edge of the window glass so that the edge of the window glass when embraced by the strip is seated within the U-shaped portions of the clips, the clips being spaced apart along the length of the strip with the locking portions of the clips respectively extending from within the channel of the strip and through respective one of the apertures to the outside of the strip, each locking portion on the outside of the strip defining a locking formation,
 each locking formation lockingly engaging itself relative to the window frame, when the strip with the U-shaped portions of the clips seated in its channel and with the window glass embraced by the strip and seated in the U-shaped portions is positioned adjacent to the window frame, so as to mount the window glass in the frame.

11. The arrangement according to claim 10, in which at least part of the said internal surface of the channel defines a recess opening into the channel for receiving and locating at least part of the U-shaped portion of each of the clips.

12. The arrangement according to claim 10, including sealing means for sealing between the strip and each clip where the clip passes through the respective aperture.

13. The arrangement according to claim 10, in which the locking formation of each clip includes locating means for engaging the window frame as the glass carrying the strip and the clips is moved into position in the window frame, the respective locating means serving to position the window glass correctly with respect to the window frame.

14. The arrangement according to claim 10, in which the locking portion of each clip is elastically deformable on engagement with the window frame to allow the locking formations to pass the edge of the window frame so as to lock against the window frame upon resiling of the locking portions.

15. The arrangement according to claim 10, including flexible lip means extending inwardly into the channel of the strip from a said side wall thereof so as sealingly to engage a face of the window glass therein.

16. The arrangement according to claim 10, including at least one lip extending longitudinally of the strip and positioned on an external surface thereof so as sealingly to engage against the window frame.

17. A glass mounting arrangement for securing a pane of window glass in a frame, comprising
 a flexible channel-shaped strip for providing a seal between an edge of the window glass and the frame, the channel having an internal channel-shaped surface defined by a base and oppositely facing side walls, at least one recess being defined in the said surface and opening into the channel,
 at least one clip having a U-shaped portion, said U-shaped portion embracing the edge of the window glass and seating in the channel of the strip and at least partially being located in the recess so as to locate the embraced edge of the window glass within the channel of the strip,
 the clip including securing means, operative when the strip with the clip secured thereon is fitted to the window glass, for lockingly engaging the frame, thereby securing the window glass to the frame.

18. The arrangement according to claim 17, including at least one aperture defined in one of the side walls of the channel, the clip having a locking portion extending from the U-shaped portion when seated in the channel and through the said aperture to the outside of the channel to provide a part of the locking portion outside the channel, the said part defining a locking formation for lockingly engaging the window frame.

* * * * *